(12) United States Patent
Kambe

(10) Patent No.: US 12,540,586 B2
(45) Date of Patent: Feb. 3, 2026

(54) FUEL SUPPLY DEVICE

(71) Applicant: KABUSHIKI KAISHA TOYOTA JIDOSHOKKI, Kariya (JP)

(72) Inventor: Hiroki Kambe, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 18/774,274

(22) Filed: Jul. 16, 2024

(65) Prior Publication Data

US 2025/0035063 A1 Jan. 30, 2025

(30) Foreign Application Priority Data

Jul. 28, 2023 (JP) ................................. 2023-123264

(51) Int. Cl.
*F02D 41/30* (2006.01)
*F02D 41/40* (2006.01)

(52) U.S. Cl.
CPC ....... *F02D 41/3094* (2013.01); *F02D 41/402* (2013.01)

(58) Field of Classification Search
CPC ............... F02D 41/3094; F02D 41/402; F02D 19/0644; F02M 21/0206
See application file for complete search history.

(56) References Cited

U.S. PATENT DOCUMENTS

| 9,856,835 | B1* | 1/2018 | Coldren | ............. F02M 21/0284 |
| 2004/0016416 | A1* | 1/2004 | Ichihara | .............. F02D 41/3094 123/308 |
| 2006/0254562 | A1* | 11/2006 | Akita | ..................... B60K 6/445 180/65.265 |
| 2012/0160221 | A1* | 6/2012 | Munshi | .............. F02M 21/0206 123/575 |
| 2016/0245239 | A1* | 8/2016 | Henry | .................... F02M 26/35 |

FOREIGN PATENT DOCUMENTS

| JP | 2003-083138 A | 3/2003 |
| JP | 2011-058435 A | 3/2011 |
| JP | 2014-105596 A | 6/2014 |

* cited by examiner

*Primary Examiner* — Syed O Hasan
(74) *Attorney, Agent, or Firm* — Sughrue Mion, PLLC

(57) ABSTRACT

A fuel supply device for a four-cycle internal combustion engine using hydrogen as fuel and including cylinders, comprising: an intake passage including a branch portion branching from an upstream side toward a downstream side so as to correspond to the number of cylinders, a single pipe portion on an upstream side of the branch portion, and intake port portions on a downstream side of the branch portion; and a plurality of first fuel injection valves provided in each of the intake port portions, wherein a maximum injection period of the first fuel injection valve is corresponding to an opening period of an intake valve of the internal combustion engine, a second fuel injection valve is provided in the single pipe portion or the branch portion, and a minimum injection quantity of the second fuel injection valve is smaller than a minimum injection quantity of the first fuel injection valve.

4 Claims, 6 Drawing Sheets

FUEL SUPPLY DEVICE

TECHNICAL FIELD

The present disclosure relates to a fuel supply device.

CROSS-REFERENCE TO RELATED APPLICATION

This application claims the benefit of priority from Japanese Patent Application No. 2023-123264, filed on Jul. 28, 2023, the entire contents of which are incorporated herein by reference.

BACKGROUND

Conventionally, a port injection type internal combustion engine in which a fuel injection valve is provided in an intake port and fuel is injected into the intake port is known (for example, see Japanese Unexamined Patent Publication No. 2011-058435).

Recently, an internal combustion engine using hydrogen as fuel has been studied. Considering the amount of heat per volume of hydrogen, it is necessary to increase the volume of gas to be injected as compared with other gaseous fuels, for example, in order to generate the same amount of heat. However, in general, when the maximum flow rate of a fuel injection valve is increased, the minimum injection quantity corresponding to the minimum injection period of the fuel injection valve also tends to increase along with the maximum flow rate. Therefore, for example, in a case where the flow rate of the fuel is small, such as during idling, the minimum injection quantity of the fuel injection valve may be too large to appropriately supply the fuel.

The present disclosure provides a fuel supply device capable of appropriately supplying fuel even when the fuel flow rate to be injected by a fuel injection valve is small in an internal combustion engine that uses hydrogen as a fuel.

SUMMARY

A fuel supply device according to one aspect of the present disclosure is a fuel supply device for a four-cycle internal combustion engine using hydrogen as fuel and including a plurality of cylinders, the fuel supply device including: an intake passage including a branch portion branching from an upstream side toward a downstream side so as to correspond to the number of cylinders, a single pipe portion on an upstream side of the branch portion, and intake port portions on a downstream side of the branch portion; and a plurality of first fuel injection valves provided in each of the intake port portions. A maximum injection period of the first fuel injection valve is a value corresponding to a valve opening period of an intake valve of the internal combustion engine, a second fuel injection valve is provided in the single pipe portion or the branch portion, and a minimum injection quantity of the second fuel injection valve is smaller than a minimum injection quantity of the first fuel injection valve.

DETAILED DESCRIPTION

Figure 1:
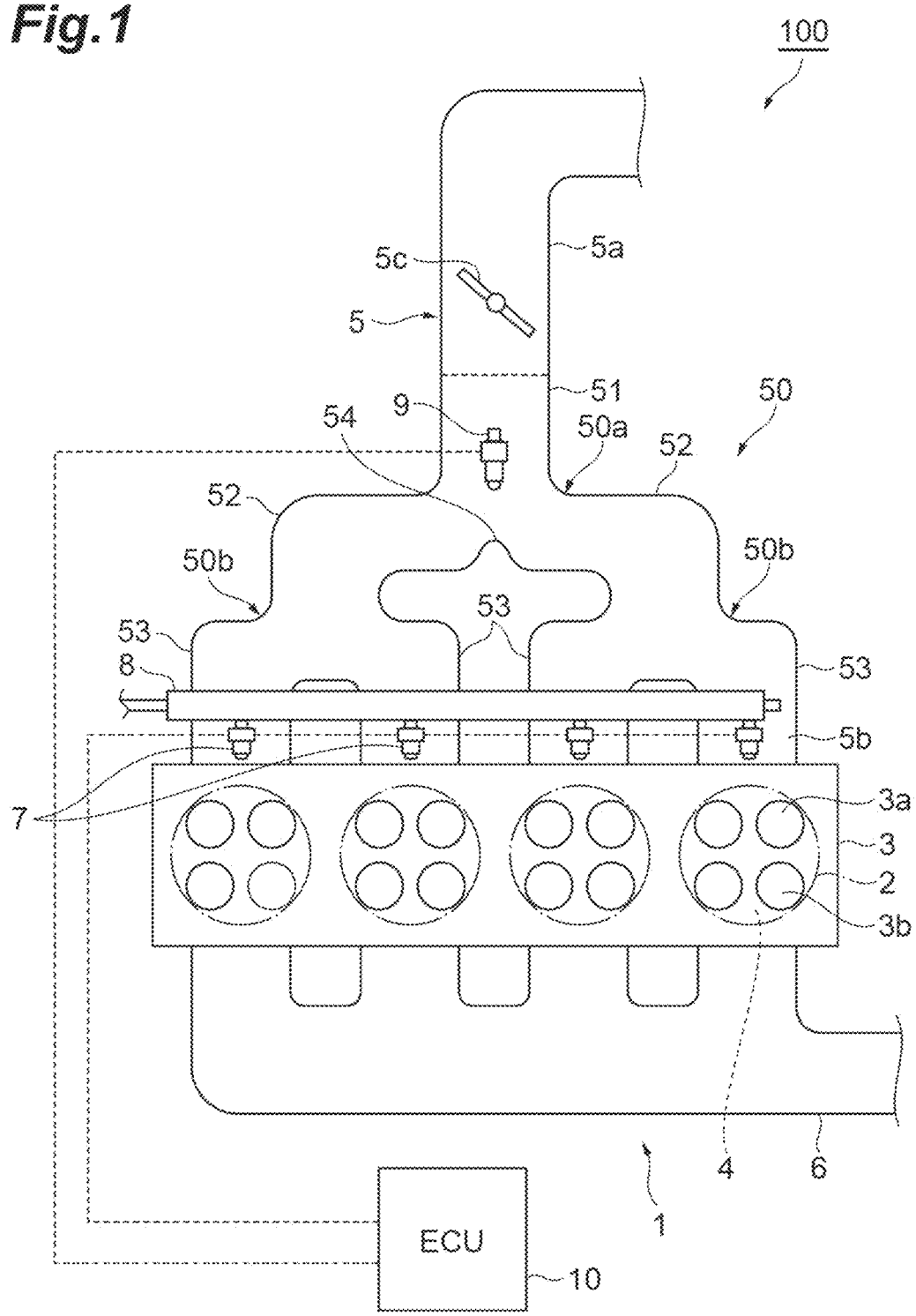
FIG. 1 is a schematic configuration diagram of an internal combustion engine including a fuel supply device according to an embodiment.

Hereinafter, embodiments of the present disclosure are described in detail with reference to the drawings. In the drawings, the same or equivalent elements will be denoted by the same reference signs, and a repeated description will be omitted.

FIG. 1 is a schematic configuration diagram of an internal combustion engine including a fuel supply device according to an embodiment. As illustrated in FIG. 1, a fuel supply device 100 is a device that controls the supply of fuel to an internal combustion engine 1. The fuel supply device 100 is installed in, for example, a vehicle or the like.

The internal combustion engine 1 is configured as a hydrogen engine that operates using hydrogen gas (hereinafter, simply referred to as "hydrogen") as fuel. The internal combustion engine 1 is configured as a four-cycle port injection type reciprocating engine, for example.

The internal combustion engine 1 includes a plurality of cylinders 2 (for example, four cylinders). In each of the cylinders 2, a combustion chamber 4 is defined by a cylinder head 3 including an intake valve 3a and an exhaust valve 3b and a piston. The internal combustion engine 1 intakes air and hydrogen through the intake valve 3a. The internal combustion engine 1 burns hydrogen in the combustion chamber 4 and exhausts the exhaust gas generated by the combustion through the exhaust valve 3b.

In the internal combustion engine 1, an intake passage 5 and an exhaust passage 6 are connected to communicate with the combustion chamber 4. As an example, the intake passage 5 includes an intake manifold (branch portion) 50 that branches from the upstream side to the downstream side so as to correspond to the number of cylinders, a single pipe portion 5a on the upstream side of the intake manifold 50, and an intake port portion 5b on the downstream side of the intake manifold 50. The single pipe portion 5a is provided with a throttle valve 5c that adjusts the flow rate of the intake air. The single pipe portion 5a means the intake passage 5 from the introduction portion of the intake air including air cleaner to the upstream end of an inlet portion 51 of the intake manifold 50.

The intake manifold 50 corresponds to four cylinders 2 here. The intake manifold 50 is a 1-2-4 type manifold which branches from one inlet portion 51 into four intake port portions 5b. That is, the intake manifold 50 includes a first branch portion 50a branching from the inlet portion 51, which is one intake passage, into two intake passages 52, and a pair of second branch portions 50b further branching from the two intake passages 52 on the downstream side of the first branch portion 50a to two each of intake passages 53 (four intake passages in total). Each of the intake passages 53 extends in a predetermined length. In each of the intake passages 53, the side of the cylinder head 3 corresponds to the intake port portion 5b.

The intake manifold 50 includes a guide portion 54. As an example, the guide portion 54 is provided at a position branching from one inlet portion 51 to the two intake passages 52. Here, the guide portion 54 allows the inlet portion 51, which is an upstream intake passage on the upstream side, and the intake passages 52, which are two or more downstream intake passages on the downstream side, to communicate with each other. The guide portion 54 guides intake air so as to distribute the intake air flowing through the inlet portion 51 to each of the intake passages 52.

The guide portion 54 may be, for example, a protrusion protruding in a mountain shape from a boundary portion of the two intake passages 52 toward the internal space of the inlet portion 51. When the intake manifold 50 is cast, the protrusion of the guide portion 54 can be formed by using a mold with a boundary portion between the two intake passages 52 having a shape corresponding to the protrusion. When the intake manifold 50 is made of sheet metal, the protrusion of the guide portion 54 can be formed by using a sheet metal member at a boundary portion between the two intake passages 52 having a shape corresponding to the protrusion.

The internal combustion engine 1 includes a plurality of first fuel injection valves 7 provided in each of the intake port portions 5b, respectively. For example, each of the four first fuel injection valves 7 is attached to a rail 8 with its base end side bridged across the four intake port portions 5b. Each of the first fuel injection valves 7 is fixed such that the tip side is pressed against an attachment hole provided in the intake port portion 5b. The first fuel injection valve 7 is a primary fuel injection valve (injector) in the internal combustion engine 1 that uses hydrogen as a fuel. Hydrogen is supplied from a fuel tank to the first fuel injection valve 7 through the rail 8. The first fuel injection valve 7 injects hydrogen into the intake port portion 5b.

The first fuel injection valve 7 has a maximum injection quantity corresponding to a flow rate (maximum flow rate) of the fuel required for a full load operation of the internal combustion engine 1. The maximum injection quantity of the first fuel injection valve 7 corresponds to the flow rate of hydrogen in the maximum injection period of the first fuel injection valve 7. Here, in the four-cycle internal combustion engine using hydrogen as fuel, considering the amount of heat per volume of hydrogen, it is necessary to increase the volume of gas to be injected as compared with other gaseous fuels (for example, LPG or the like), in order to generate the same amount of heat, for example. Therefore, the first fuel injection valve 7 is configured as a so-called high flow rate injector. The high flow rate injector means, for example, an injector in which an injection hole diameter is increased to increase the flow rate.

Figure 2:
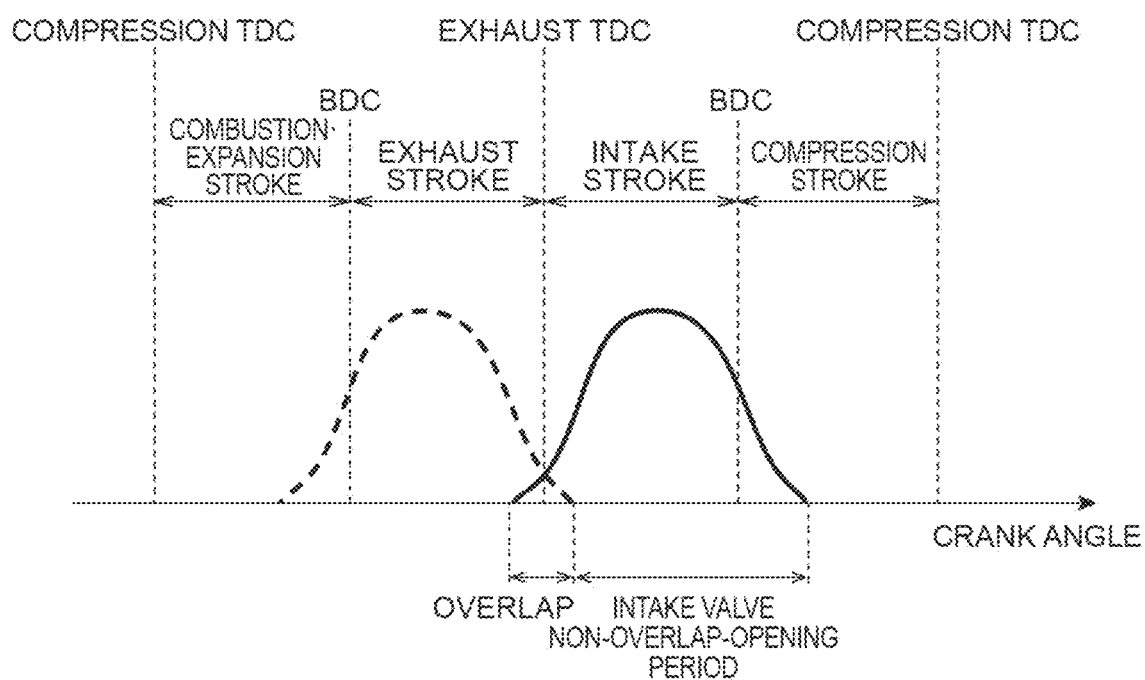
FIG. 2 is a diagram illustrating the injection period of a fuel injection valve.

FIG. 2 is a diagram illustrating the injection period of a fuel injection valve. The horizontal axis in FIG. 2 represents the crank angle of the internal combustion engine 1. The vertical axis in FIG. 2 represents the valve opening amount of the intake valve 3a or the exhaust valve 3b. As illustrated in FIG. 2, in the four-cycle internal combustion engine, there may be an overlap period during which both the intake valve 3a and the exhaust valve 3b are open. Here, in the internal combustion engine 1 of the port injection type using hydrogen as fuel, hydrogen is supplied during a period in which the intake valve 3a is open. However, in order to prevent backfire to the intake passage 5, there is a tendency to avoid injecting hydrogen in the overlap period during which not only the intake valve 3a but also the exhaust valve 3b is open. Therefore, the maximum injection period of the first fuel injection valve 7 is a period that falls within the period during which only the intake valve 3a is open. That is, in the fuel supply device 100, the maximum injection period of the first fuel injection valve 7 is a value corresponding to the valve opening period of the intake valve 3a of the internal combustion engine 1.

In a case where there is the overlap period, the maximum injection period of the first fuel injection valve 7 is a period that falls within an intake valve non-overlap-opening period that is a period during which the intake valve 3a is open after the exhaust valve 3b is closed (see FIG. 2). In a case where there is no overlap period, the maximum injection period of the first fuel injection valve 7 is a period that falls within the entire period during which the intake valve 3a is open. The "period during which the intake valve 3a is open" means a period during which the valve opening amount of the intake valve 3a is larger than 0. The "period during which the intake valve 3a is open" may mean a period during which the valve opening amount of the intake valve 3a is substantially larger than 0, for example, such that the valve opening amount is equal to or larger than a predetermined valve opening determination value.

On the other hand, the minimum injection quantity corresponding to the minimum injection period of the first fuel injection valve 7 will be described. In general, in the injector, for example, when the injection period is too short, there is a possibility that the lift amount of the needle in the injector is insufficient and the flow rate per injection is not stabilized. Therefore, the minimum injection quantity is stabilized by determining the minimum injection period in advance through design as a hardware constraint of the injector. Here, for example, when the injection hole diameter is increased in order to increase the maximum injection quantity, the injection quantity in the minimum injection period is also affected. That is, the minimum injection quantity of the first fuel injection valve 7 is increased due to the increase in the maximum injection quantity of the first fuel injection valve 7, as compared with the minimum injection quantity of the fuel injection valve used with other gaseous fuels (for example, LPG or the like).

When the minimum injection quantity of the first fuel injection valve 7 tends to increase as described above, for example, in a case where the flow rate of the fuel to be supplied to the internal combustion engine 1 is small, such as during idling, the flow rate of the fuel to be supplied to the internal combustion engine 1 may be smaller than the minimum injection quantity of the first fuel injection valve 7. Therefore, the fuel supply device 100 includes a second fuel injection valve 9 having a minimum injection quantity smaller than the minimum injection quantity of the first fuel injection valve 7.

The second fuel injection valve 9 is a fuel injection valve for supplying fuel at a flow rate smaller than the minimum injection quantity of the first fuel injection valve 7 in the internal combustion engine 1 that uses hydrogen as fuel. The minimum injection quantity of the second fuel injection valve 9 is smaller than the minimum injection quantity of the first fuel injection valve 7. The minimum injection quantity of the second fuel injection valve 9 may correspond to, for example, the flow rate equal to or less than the minimum fuel flow rate which is the combustion limit on the low load side of the internal combustion engine 1 so as to be able to cover the flow rate on the low flow rate side of the fuel to be supplied to the internal combustion engine 1. The minimum fuel flow rate can be obtained by, for example, a bench test of an internal combustion engine 1 or the like. The maximum injection quantity of the second fuel injection valve 9 may be equal to or larger than the minimum injection quantity of the first fuel injection valve 7.

In the example of FIG. 1, the second fuel injection valve 9 is provided on the intake manifold 50. More specifically, the second fuel injection valve 9 is provided at the inlet portion 51 of the intake manifold 50 so as to inject fuel from the inlet portion 51 toward the guide portion 54. Unlike the first fuel injection valve 7, hydrogen is supplied from the fuel tank to the second fuel injection valve 9 without passing through the rail 8. As described above, by providing the second fuel injection valve 9 in the intake manifold 50, it is possible to suppress restriction of the degree of freedom in layout due to installation of the rail or the like, for example, as compared with a configuration in which additional injectors corresponding to the number of cylinders are provided in the intake port portion 5b.

The fuel supply device 100 includes an electronic control unit (ECU) 10. The ECU 10 is an electronic control unit that controls the internal combustion engine 1. The ECU 10 includes a central processing unit (CPU), a read only memory (ROM), a random access memory (RAM), a communication circuit, and the like. In the ECU 10, for example, a program stored in the ROM is loaded into the RAM, and the program loaded into the RAM is executed by the CPU to implement various functions. The ECU 10 may be composed of a plurality of electronic units.

Figure 3:
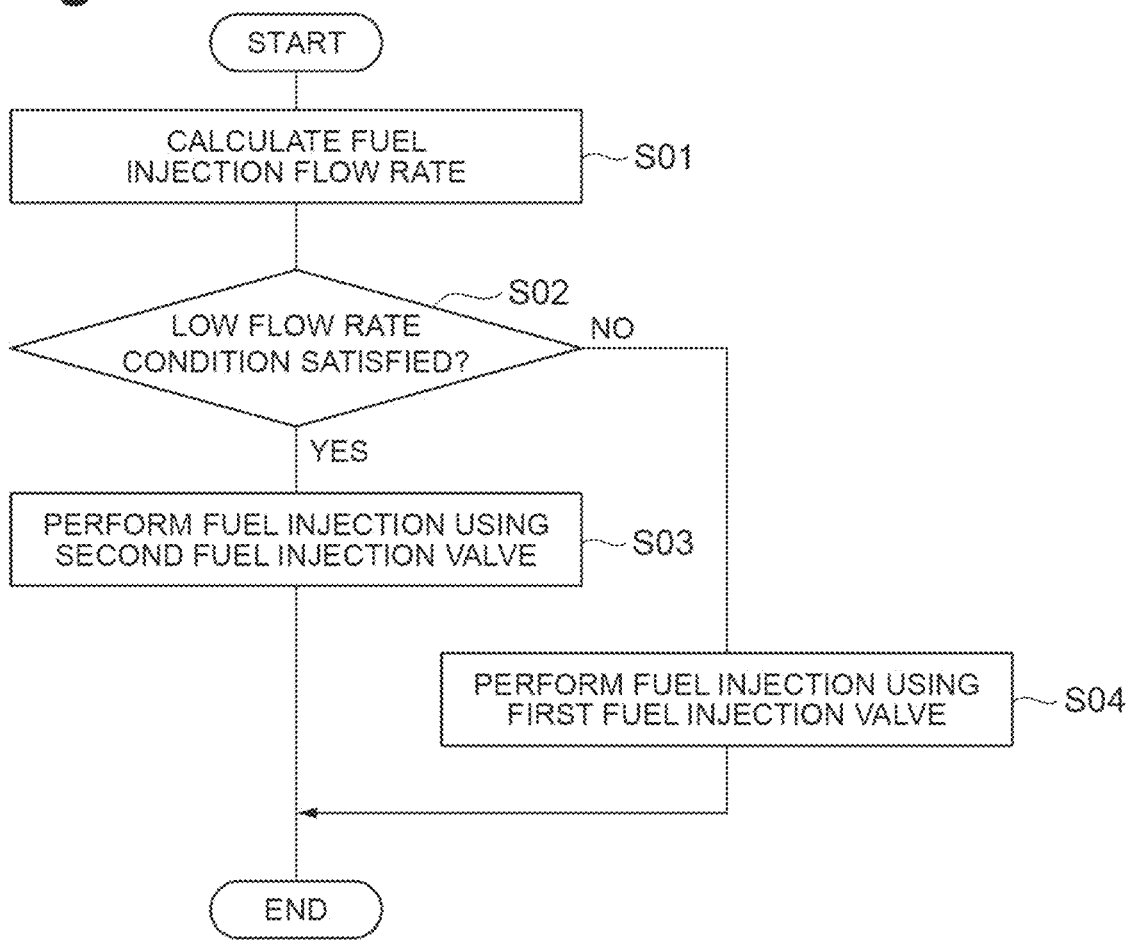
FIG. 3 is a flowchart illustrating a processing example of fuel injection by the ECU of FIG. 1.

The ECU 10 controls the first fuel injection valve 7 and the second fuel injection valve 9. A functional example and a processing example of the ECU 10 will be described with reference to FIG. 3 and FIG. 4. FIG. 3 is a flowchart illustrating a processing example of fuel injection by the ECU of FIG. 1. The processing of FIG. 3 is performed while the internal combustion engine 1 is running.

As illustrated in FIG. 3, the ECU 10 calculates the fuel injection flow rate in S01. The ECU 10 calculates the fuel injection flow rate based on, for example, a detection signal of an engine rotation sensor that detects the engine rotation speed of the internal combustion engine 1 and a detection signal of an intake amount sensor that detects a detection value related to the intake amount of the internal combustion engine 1. As the engine rotation sensor, a known configuration (for example, a crank angle sensor or the like) can be used. As the intake amount sensor, a known configuration (for example, an intake negative pressure sensor, an air flow sensor, or the like) can be used.

In S02, the ECU 10 determines whether or not a predetermined low flow rate condition is satisfied. The low flow rate condition is a condition for switching whether or not fuel is injected by the second fuel injection valve 9. For example, the ECU 10 may determine whether or not the low flow rate condition is satisfied based on whether or not the calculated fuel injection flow rate is smaller than the minimum injection quantity of the first fuel injection valve 7.

In a case where it is determined that the low flow rate condition is satisfied (S02: YES), the ECU 10 performs fuel injection at the calculated fuel injection flow rate using the second fuel injection valve 9 in S03. That is, in a case where a predetermined low flow rate condition is satisfied, the ECU 10 causes the second fuel injection valve 9 to inject fuel instead of the first fuel injection valve 7. Thereafter, the ECU 10 ends the processing of FIG. 3.

On the other hand, in a case where it is determined that the low flow rate condition is not satisfied (S02: NO), the ECU 10 performs fuel injection at the calculated fuel injection flow rate using the first fuel injection valve 7 in S04. In this case, the ECU 10 may perform fuel injection using both the first fuel injection valve 7 and the second fuel injection valve 9 in combination. Thereafter, the ECU 10 ends the processing of FIG. 3.

The ECU 10 may learn injection quantity variation among a plurality of the first fuel injection valves 7. The injection quantity variation means variation in the injection quantity of fuel for each cylinder 2. The injection quantity variation is caused by, for example, manufacturing tolerance of the first fuel injection valve 7 or the like. Here, in the fuel supply device 100 including the second fuel injection valve 9 in addition to the plurality of first fuel injection valves 7, during the fuel injection of the second fuel injection valve 9, the fuel injected by the second fuel injection valve 9 may affect the injection quantity variation among the first fuel injection valves 7. Therefore, the ECU 10 may learn the injection quantity variation among the plurality of first fuel injection valves 7 in a case where the fuel injection by the second fuel injection valve 9 is not performed. The learning itself of the injection quantity variation can be performed by a known learning method based on, for example, the variation of the engine rotation speed for each cylinder 2.

Figure 4:
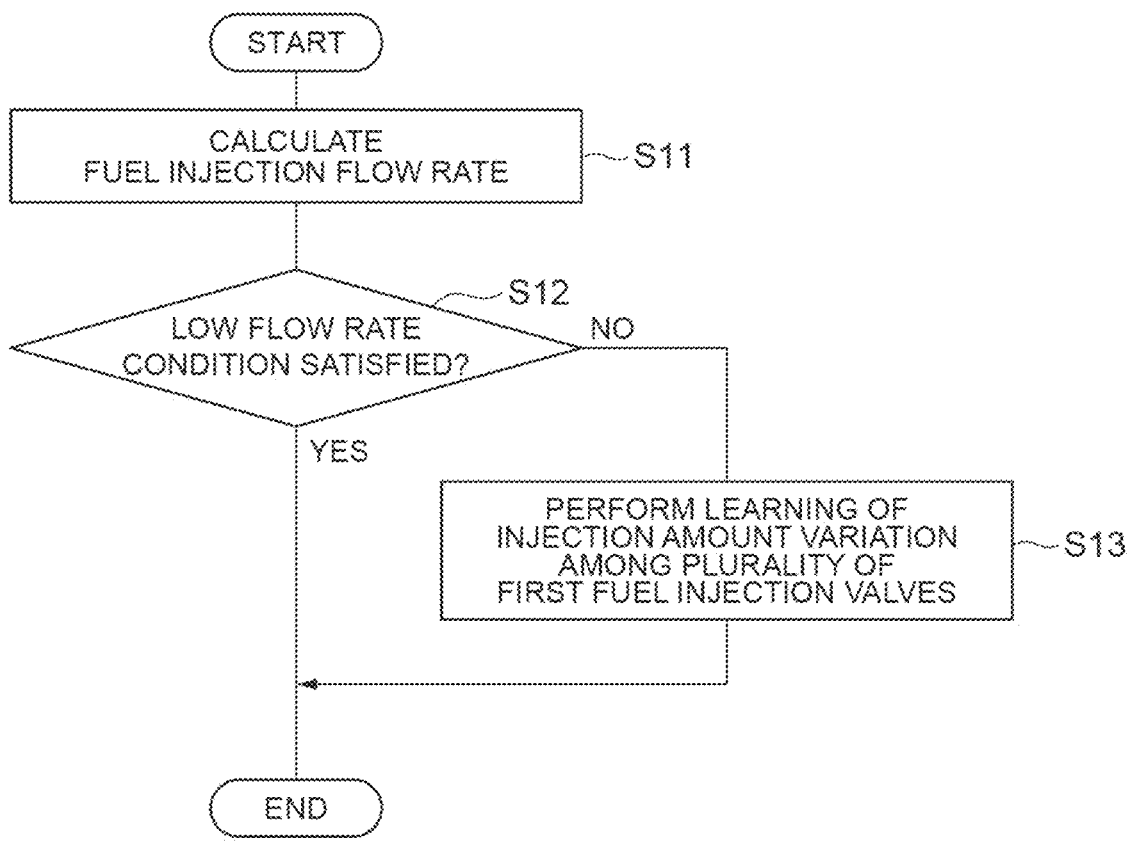
FIG. 4 is a flowchart illustrating an example of the injection quantity variation learning processing of the ECU in FIG. 1.

FIG. 4 is a flowchart illustrating a processing example of the injection quantity variation learning of the ECU in FIG. 1. As illustrated in FIG. 4, the ECU 10, in S11, calculates the fuel injection flow rate similarly to S01 of FIG. 3.

In S12, similarly to S02 of FIG. 3, the ECU 10 determines whether or not a predetermined low flow rate condition is satisfied.

In a case where it is determined that the low flow rate condition is satisfied (S12: YES), the ECU 10 ends the processing of FIG. 3 without performing learning the injection quantity variation among the plurality of first fuel injection valves 7. On the other hand, in a case where it is determined that the low flow rate condition is not satisfied (S12: NO), the ECU 10 performs learning of the injection quantity variation among the plurality of first fuel injection valves 7 in S13. Thereafter, the ECU 10 ends the processing of FIG. 3.

[Operation and Effects]

In the fuel supply device 100 as described above, for example, in a case where the flow rate of the fuel to be supplied to the internal combustion engine 1 is small, such as during idling, the second fuel injection valve 9 is used, so that it is possible to supply the fuel at a flow rate smaller than the minimum injection quantity of the first fuel injection valve 7. Therefore, according to the fuel supply device 100, even when the fuel flow rate to be injected by the fuel injection valve is small in the internal combustion engine 1 that uses hydrogen as fuel, the fuel can be appropriately supplied.

In the fuel supply device 100, the intake manifold 50 communicates the inlet portion 51 which is an upstream intake passage on the upstream side and the intake passages 52 which are two or more downstream intake passages on the downstream side. The intake manifold 50 includes the guide portion 54 that guides intake air so as to distribute the intake air flowing through the inlet portion 51 to each of the intake passages 52. The second fuel injection valve 9 is provided in the intake manifold 50 so as to inject fuel from the inlet portion 51 toward the guide portion 54. As a result, the fuel injected from the second fuel injection valve 9 is more reliably guided by the guide portion 54. The fuel injected from the second fuel injection valve 9 is easily appropriately distributed to the plurality of cylinders 2.

The second fuel injection valve 9 is provided in the intake manifold 50, so that it is possible to suppress restriction of the degree of freedom in layout due to installation of the rail or the like, for example, as compared with a configuration in which additional injectors corresponding to the number of cylinders are provided in the intake port portion 5b. As a result, the degree of freedom in installation is increased. In addition, the cost can be reduced by reducing the number of the second fuel injection valves 9.

The fuel supply device 100 further includes the ECU 10 that controls the first fuel injection valve 7 and the second fuel injection valve 9. The ECU 10 causes the second fuel injection valve 9 to inject fuel in a case where a predetermined low flow rate condition is satisfied. The ECU 10 learns the injection quantity variation among the plurality of first fuel injection valves 7 in a case where the low flow rate condition is not satisfied. As a result, in the internal combustion engine 1 including the first fuel injection valve 7 and the second fuel injection valve 9, the inter-cylinder variation can be appropriately learned.

Modification

Although the embodiments according to the present disclosure have been described above, the present disclosure is not limited to the embodiments described above.

Figure 5:
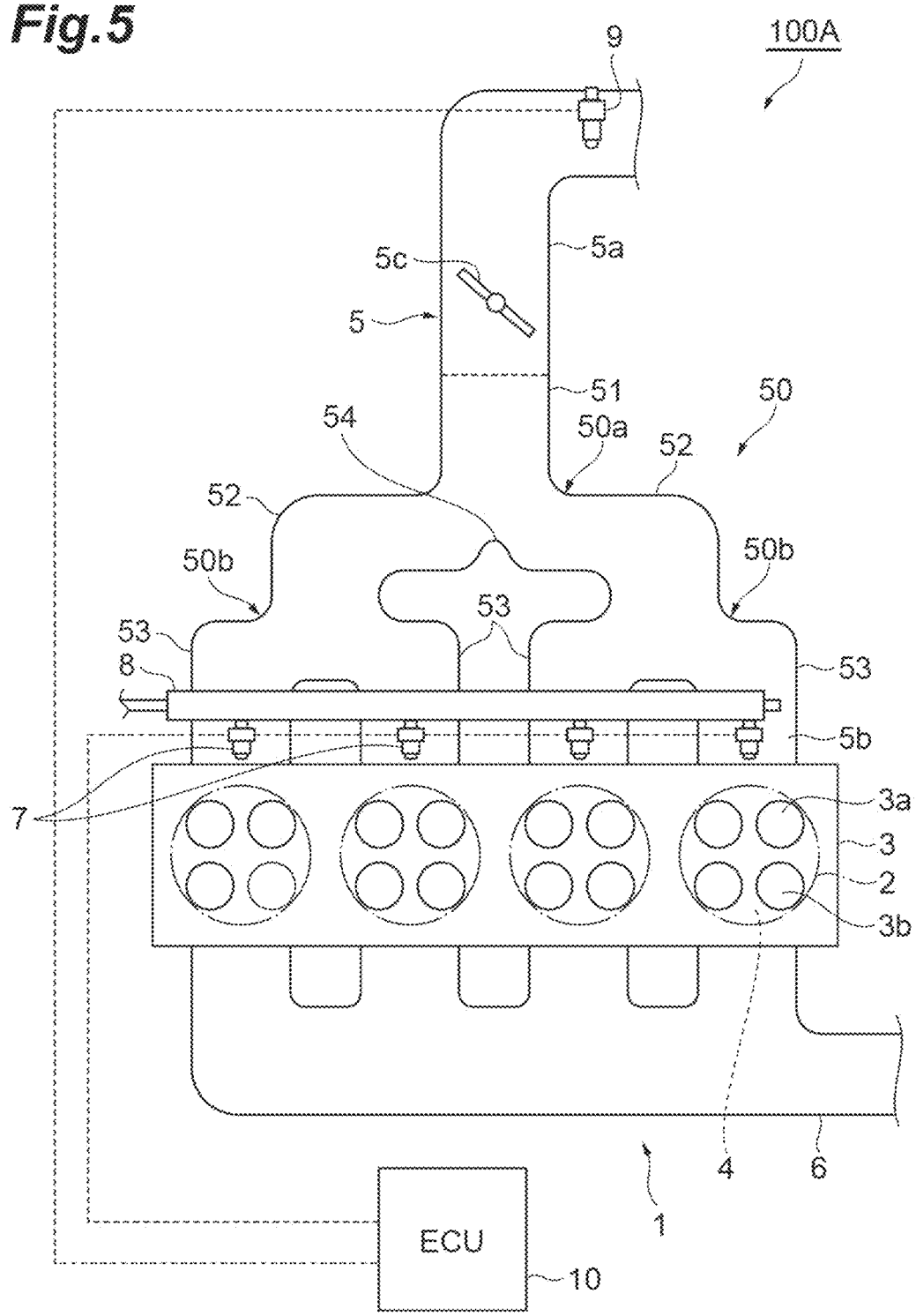
FIG. 5 is a schematic configuration diagram of an internal combustion engine including a fuel supply device according to a first modification.

In the above embodiments, the second fuel injection valve 9 is provided in the intake manifold 50 and is located on the downstream side of the throttle valve 5c, but the invention is not limited thereto. For example, as illustrated in a fuel supply device 100A of FIG. 5, the second fuel injection valve 9 may be provided on the upstream side of the throttle valve 5c in the single pipe portion 5a. As an example of the branch portion, the 1-2-4 type intake manifold 50 including tubular intake passages is exemplified, but the branch portion is not limited thereto. For example, the branch portion may be a 1-4 type intake manifold. The branch portion may include a volume portion corresponding to a surge tank while considering the backfire. The internal combustion engine may include a plurality of cylinders other than four cylinders. The branch portion may be an intake manifold corresponding to the number of cylinders other than four cylinders. In short, the second fuel injection valve should be provided in the single pipe portion or the branch portion.

Figure 6:
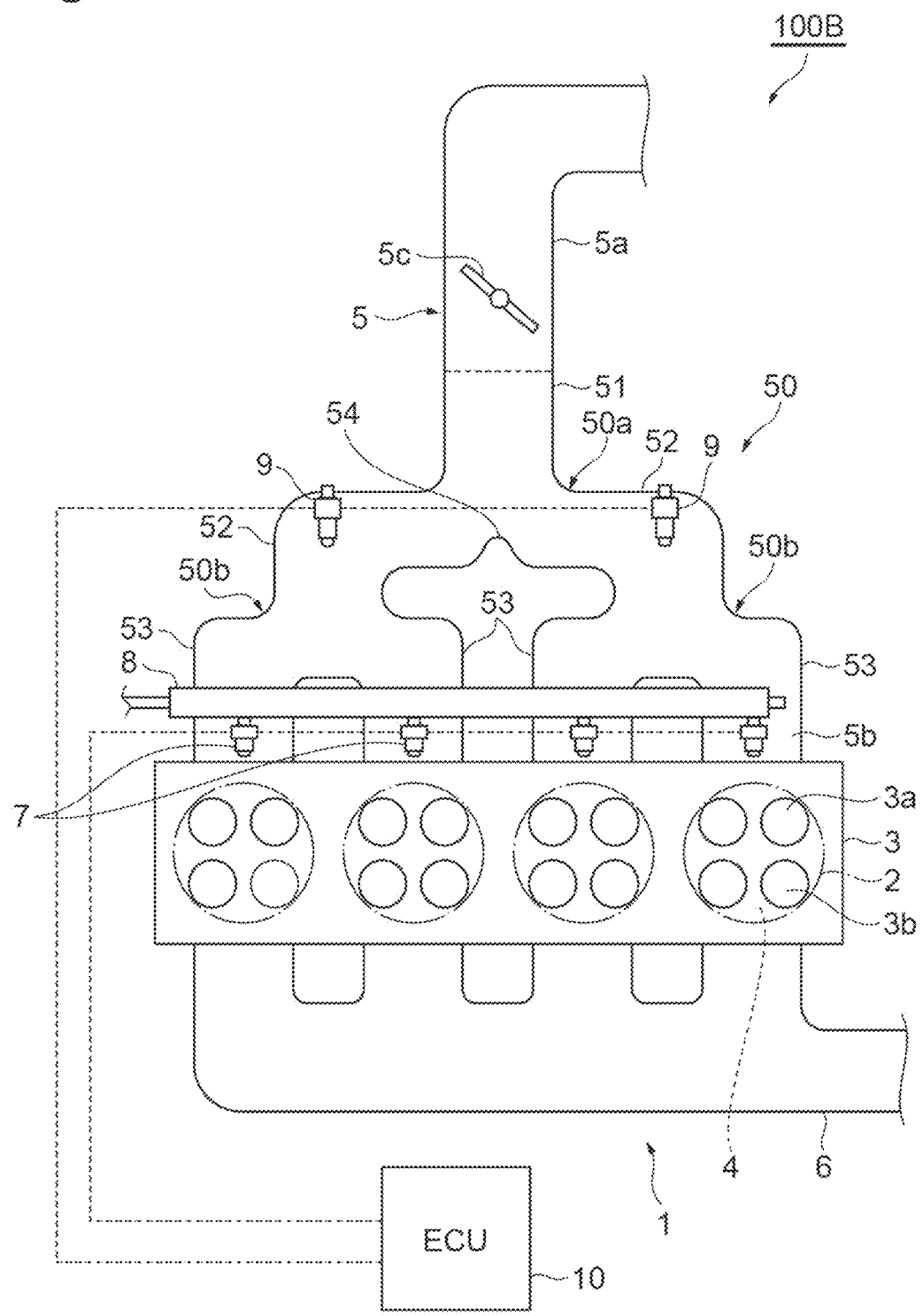
FIG. 6 is a schematic configuration diagram of an internal combustion engine including a fuel supply device according to a second modification.

In the above embodiments, the second fuel injection valve 9 is provided at the inlet portion 51 of the intake manifold 50 so as to inject fuel from the inlet portion 51 toward the guide portion 54, but the invention is not limited thereto. For example, as illustrated in a fuel supply device 100B of FIG. 6, the second fuel injection valve 9 may be provided in each of the pair of second branch portions 50b. In this case, the fuel injected from the second fuel injection valve 9 reaches inside the cylinder 2 earlier as compared with the case where the second fuel injection valve 9 is provided in the first branch portion 50a. Therefore, it is possible to improve the responsiveness of the internal combustion engine 1. In the example of FIG. 6, the second branch portion 50b does not include a guide portion, but the invention is not limited thereto. The second branch portion 50b may include a guide portion.

In the above embodiments, the first fuel injection valve 7 is the primary fuel injection valve in the internal combustion engine 1 using hydrogen as fuel, but the invention is not limited thereto. The second fuel injection valve 9 may be a primary fuel injection valve.

What is claimed is:

1. A fuel supply device for a four-cycle internal combustion engine using hydrogen as fuel and including a plurality of cylinders, comprising: an intake passage including an intake manifold branching from an upstream end toward a downstream end so as to correspond to the number of cylinders, a single pipe portion on the upstream end of the intake manifold so that a downstream end of the single pipe portion is connected in series to the upstream end of the intake manifold, and a plurality of intake port portions on the downstream end of the intake manifold, wherein a downstream end of each of the plurality of intake port portions is connected respectively to the plurality of cylinders; and a plurality of first fuel injection valves provided in each of the intake port portions, wherein a maximum injection period of the first fuel injection valve is a value corresponding to a valve opening period of an intake valve of the internal combustion engine, a second fuel injection valve is provided in the single pipe portion downstream of the throttle valve and upstream of the intake manifold, and a minimum injection quantity of the second fuel injection valve is smaller than a minimum injection quantity of the first fuel injection valve.

2. The fuel supply device according to claim 1, wherein the intake manifold includes a guide portion, the guide portion communicates an upstream intake passage on an upstream side and two or more downstream intake passages on a downstream side and guides intake air so as to distribute the intake air flowing through the upstream intake passage to each of the downstream intake passages, and
the second fuel injection valve is provided in the intake manifold so as to inject the fuel from the upstream intake passage toward the guide portion.

3. The fuel supply device according to claim 1, wherein the intake manifold includes a first branch portion branching from one intake passage into two intake passages, and a pair of second branch portions further branching from the two intake passages on a downstream side of the first branch portion into two each of intake passages, and
the second fuel injection valve is provided in each of the pair of second branch portions.

4. The fuel supply device according to claim 1, further comprising:
a control unit configured to control the first fuel injection valve and the second fuel injection valve, wherein
the control unit
causes the second fuel injection valve to inject the fuel in a case where a predetermined low flow rate condition is satisfied, and
learns an injection quantity variation among the plurality of first fuel injection valves in a case where the low flow rate condition is not satisfied.

* * * * *